Inventor
Arthur T. McWane

June 12, 1934.　　　A. T. McWANE　　　1,962,401
PIPE JOINT
Original Filed March 4, 1932　　2 Sheets-Sheet 2
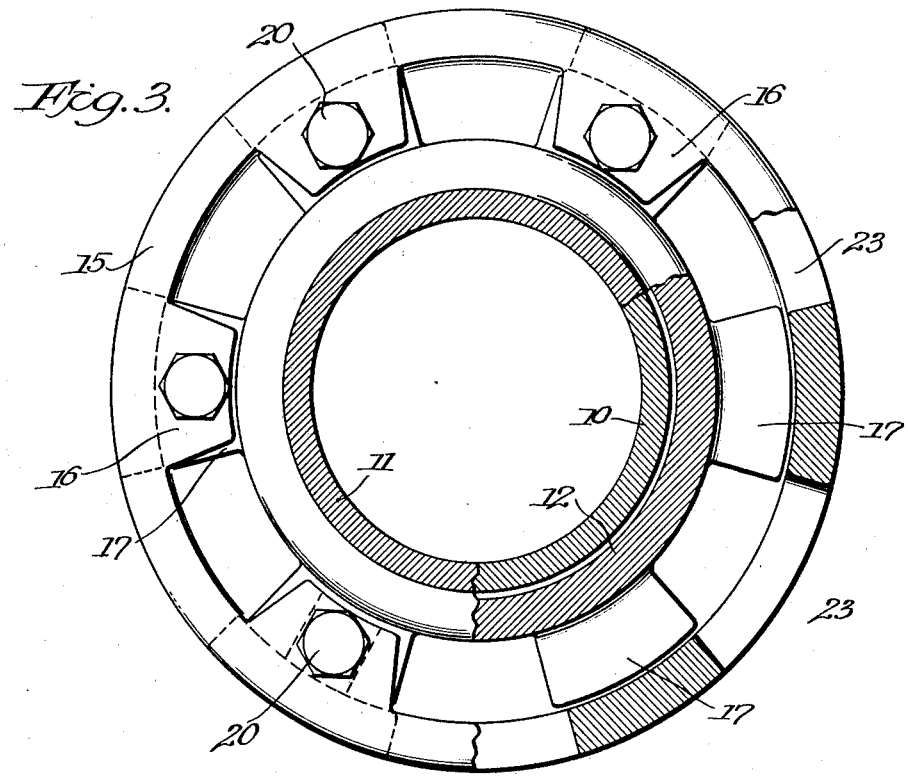
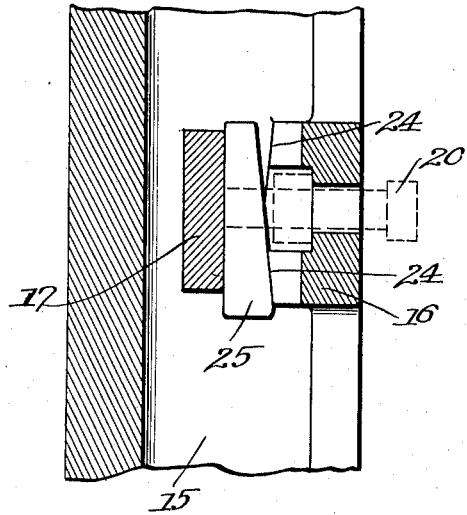
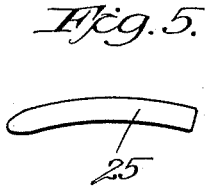
Inventor
Arthur T. McWane
By Philip E. Liggers
Attorney Patented June 12, 1934

1,962,401

UNITED STATES PATENT OFFICE 1,962,401

PIPE JOINT

Arthur T. McWane, Birmingham, Ala., assignor to McWane Cast Iron Pipe Company, Birmingham, Ala., a corporation of Alabama Application March 4, 1932, Serial No. 596,842
Renewed November 1, 1933

7 Claims. (Cl. 285—134)

This invention relates to pipe joints and, among other objects, aims to provide an improved packed joint for bell and spigot cast iron pipes and the like. The invention contemplates the provision of an improved clamping member adapted to be removably secured to a bell and having integral means to transmit clamping pressure to a deformable packing ring. This application involves certain important improvements on the type of joint disclosed in my copending application Ser. No. 596,841, filed on even date herewith.

Other aims and advantages of the invention will appear in the specification, when considered in connection with the accompanying drawings, wherein:—

Fig. 3 is a sectional view of the clamping sleeve or jacket shown in Figs. 1 and 2, shown on the pipe joint;

Fig. 4 is a fragmentary elevation showing the wedges in position; and

Fig. 5 is an elevation of one of the wedges.

Figure 1:
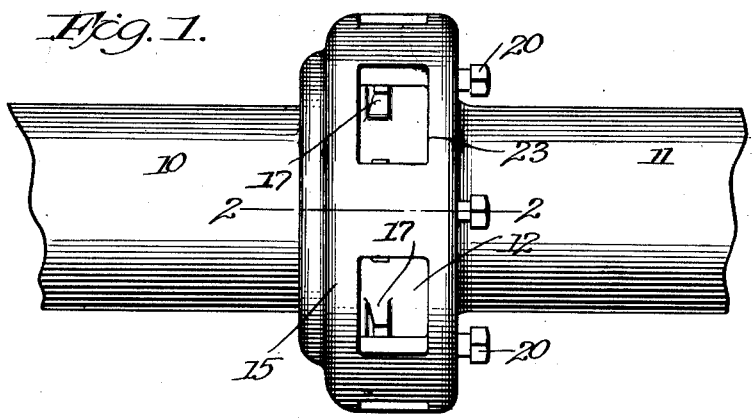
Fig. 1 is a side elevation of the preferred form of joint applied to cast iron pipe sections.

Referring particularly to the drawings, the improved pipe joint there shown is applied to a pair of cast iron pipe sections 10 and 11, the section 11 having the usual form of bell 12 and a machined surface or mouth 13 to receive a rubber packing ring or gasket 14 which is wedge-shaped in cross-section. The spigot section 10 is usually ground at its end to permit relative expansion and contraction without destroying the packing.

In this example, there is shown a substantially cylindrical clamping sleeve or jacket member 15 which is preferably made of cast iron and adapted to be removably secured to the bell at one end and to exert clamping pressure on the packing ring 14 at the other end. As will be noted in Fig. 2, the clamping sleeve or jacket has a plurality of spaced, inwardly projecting lugs 16 and the bell has a plurality of integral, radial lugs 17, the arrangement being such that the clamping jacket or sleeve may be inserted axially on the bell with the lugs 16 passing between the lugs 17 on the bell. There are six such lugs shown, but any number may be employed if desired. By turning the clamping sleeve through a part of a revolution, the lugs 16 and 17 are brought into longitudinal alinement so that each of the lugs 16 is behind a lug 17 on the bell. The other end of the clamping sleeve or jacket is shown as having an inwardly projecting annular flange 18 surrounding and slightly spaced from the spigot 10. The inner face of this flange is adapted to engage the outer end or edge of the packing ring 14 to compress it in the mouth of the bell and against the spigot.

Figure 2:
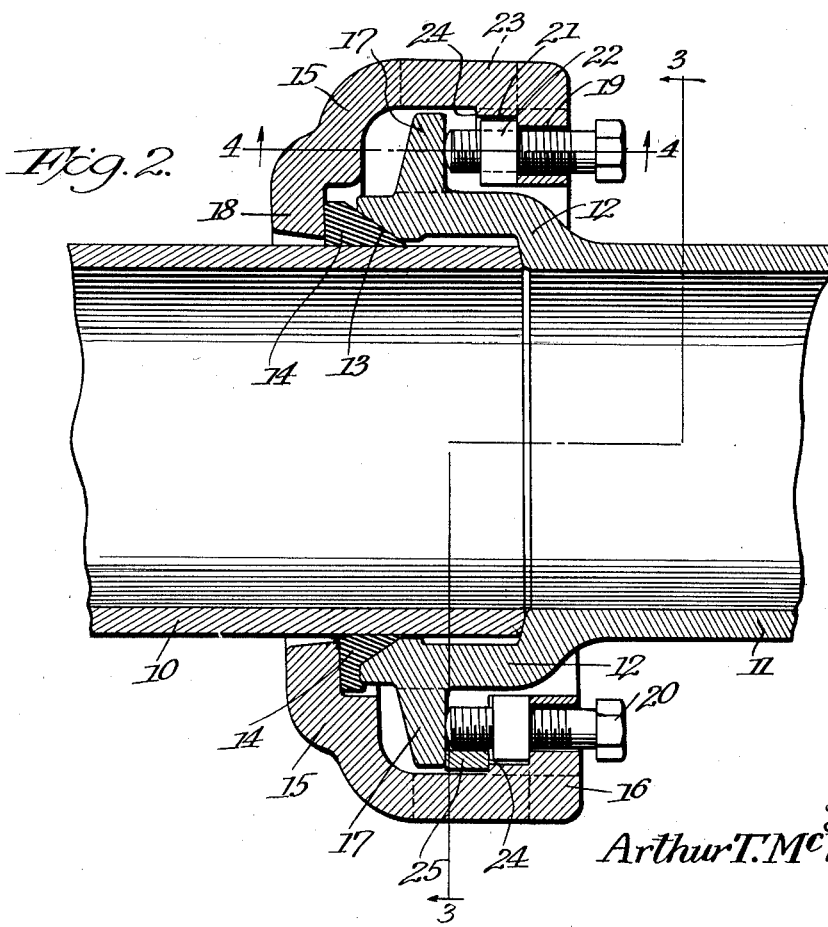
Fig. 2 is a central sectional view taken on the line 2—2 of Fig. 1.

To exert clamping pressure on the packing ring, each of the lugs 16 is here shown as having a cored opening 19 adapted to receive a bolt 20. On the inside of the lug, there is preferably formed a non-circular socket 21 to receive a nut 22 which may be square in cross-section and held against rotation in the socket. The clamping sleeve or jacket is also shown as having a series of radial openings 23 to permit insertion and removal of the nuts 22. After the parts are assembled on the bell and spigot, the bolts are adapted to be inserted and threaded through their respective nuts until their ends engage the lugs 17 as shown in Fig. 2. The bolts are then gradually tightened so as to apply uniform pressure to the packing ring all around the pipe. It has been found that ordinary steel bolts and nuts can be used for this purpose and adequate clamping pressure may be exerted by using an ordinary socket wrench on the bolts. The action of the bolts is much the same as that of a screw jack. After all of the steel bolts have been tightened, ordinary cast iron bolts may be substituted for them by removing one at a time, or, in some instances, cast iron bolts may be used originally.

It is contemplated that clamping pressure on the packing may be maintained by a series of wedges such as are employed in my aforesaid companion application. In this instance, however, the inner faces of the lugs 16 on the clamping sleeve are provided with angular faces 24 which may or may not be oppositely inclined. The arrangement is such that wedges 25 are adapted to be driven between the opposite faces on the lugs 17. The wedges are preferably made of cast iron or other metal which is noncorroding, and they are preferably curved or arcuate so as to have substantial contact areas with the faces on the lugs. When the wedge faces on the lugs 16 are inclined in both directions, the wedges may be driven into their wedging positions on either side of the bolts 20. After the wedges are applied, it is contemplated that the bolts and their nuts may be removed for use in making other joints. In fact, the same set of steel bolts may be used to assemble numerous joints. The metal wedges securely hold the clamping sleeve on the bell and maintain the compression pressure originally exerted by the bolts. Joints of this character may be preassembled or made up outside of a trench and transported or rolled into place without damage.

One of the important features of this invention resides in the shape and construction of the clamping sleeve or jacket member. It is made in one piece of rough, cast metal and requires no machining whatever. Thus, the manufacturing cost is reduced to a minimum. Moreover, the shape of the lugs on the bell is such that they may be cast on the pipe sections at very little added expense. They have sufficient draft to permit the pipe patterns to be removed from their flasks, assuming that the pipe is made in sand models. Likewise, these lugs require no machining.

It is believed that the mode of operation of the joint parts will be clearly seen upon reference to the drawings. The clamping sleeve or jacket is adapted to be slipped over the end of the spigot and the gasket ring slipped on. After the spigot is inserted in the bell, the clamping sleeve or jacket is interlocked with the lugs 17 on the bell, as heretofore explained.

Joints of the type described can be made very quickly in the field. The shape of the clamping sleeves or jackets permits the assembled pipe sections to be rolled into place after being made up on the outside of a trench. The clamping pressure applied is sufficient to withstand all ordinary working conditions, such as deflection and relative expansion and contraction of the sections.

Obviously, the present invention is not restricted to the particular embodiment thereof herein shown and described.

What is claimed is:

1. A bell and spigot pipe joint comprising, in combination, a compressible packing ring between the bell and spigot; spaced radial lugs on the bell; a clamping sleeve adapted to be slipped over the end of the bell; a flange on the clamping sleeve engaging the packing ring; and bolts passing loosely through holes in the sleeve and engaging said lugs with their ends to exert clamping pressure on the packing ring; said bolts having nuts intermediate their ends providing shoulders which engage the clamping sleeve when the bolts are tightened.

2. A bell and spigot pipe joint comprising, in combination, a compressible packing ring between the bell and spigot; spaced radial lugs on the bell; a clamping sleeve adapted to be slipped over the end of the bell; a flange on the clamping sleeve engaging the packing ring; a series of lugs on the sleeve arranged to be turned into longitudinal alinement with and behind the lugs on the bell; said lugs on the sleeve having bolt holes and nut sockets; and a series of bolts adapted to be inserted through the holes and threaded through the nuts to engage the lugs on the bell and exert clamping tension on the sleeve to compress the packing ring.

3. In a bell and spigot pipe joint having a compressible packing ring; a clamping sleeve removably mounted on the bell; a flange on the sleeve engaging the packing ring; lugs on the bell within the sleeve; bolts carried by the sleeve engaging the lugs to exert clamping pressure on the packing ring; and wedges between the rear end of the clamping sleeve and said lugs to maintain the clamping pressure.

4. In a bell and spigot pipe joint having a compressible packing ring, a plurality of circumferential spaced arcuate lugs cast integral with the bell; a cast metal clamping member having a series of inwardly projecting lugs adapted to be slipped over the bell into interlocking engagement with the lugs on the bell; a flange on the sleeve engaging the packing ring; a plurality of bolts removably connected to the lugs on said sleeve and adapted to engage the rear faces of the lugs on the bell to transmit clamping pressure to said packing ring; angularly disposed faces on the inside of the lugs on the sleeve opposite the outer faces of the lugs on the bell; and a plurality of cast metal wedges inserted between said faces and said lugs on the bell to hold the packing ring compressed and permit removal of said bolts.

5. In a bell and spigot joint for cast iron pipes and the like, a plurality of rough, circumferentially spaced lugs cast integral with the bell; a clamping member presenting a plurality of inwardly projecting, spaced lugs coacting with the lugs on the bell; an annular, inwardly projecting flange on the clamping member surrounding and slightly spaced from the spigot section; a compressible packing ring between said flange and bell; a plurality of nuts and bolts removably secured to the inwardly projecting lugs on said clamping member and so arranged that the bolts engage the rear faces of the lugs on the bell to transmit clamping pressure to said packing ring; said clamping member having a plurality of radial openings affording access to the space between its lugs and the lugs on the bell; and a plurality of cast iron wedges inserted through said openings between the opposed lugs to hold the packing ring compressed and permit the removal of said bolts.

6. In a bell and spigot joint for cast iron pipes and the like, a compressible packing ring adapted to be clamped between the bell and spigot; a cast metal clamping sleeve surrounding the bell and spigot and having an inwardly projecting flange engaging the rear face of the packing ring; a plurality of circumferentially spaced lugs on the bell; correspondingly arranged inwardly projecting lugs on the sleeve having cored openings to receive a plurality of bolts and nuts and to hold the nuts against rotation therein; said lugs on the sleeve being arranged opposite the lugs on the bell so that the bolts engage the rear faces of the lugs on the bell and transmit clamping pressure through the sleeve to the packing ring; and a plurality of rough, cast metal wedges inserted between the opposed lugs on the sleeve and on the bell to hold said packing ring compressed and permit removal of the bolts and nuts, said sleeve having a plurality of openings through which the wedges and the nuts are adapted to be inserted.

7. In a bell and spigot pipe joint, the combination with the bell and spigot, the bell having lugs projecting outwardly therefrom, of an annular sleeve surrounding the joint and having an end flange closely surrounding the spigot; a packing ring surrounding the spigot and abutted against the end of the bell to seal the joint; another end flange on the opposite end of the sleeve; and adjustable tightening means interposed between the second-named end flange and the lugs to cause the sleeve to move so as to clamp the packing ring by means of the first-named end flange.

ARTHUR T. McWANE.